(12) United States Patent
Krautkremer

(10) Patent No.: US 6,934,745 B2
(45) Date of Patent: Aug. 23, 2005

(54) METHODS, APPARATUSES AND SYSTEMS ENABLING A NETWORK SERVICES PROVIDER TO DELIVER APPLICATION PERFORMANCE MANAGEMENT SERVICES

(75) Inventor: Todd Joseph Krautkremer, Los Gatos, CA (US)

(73) Assignee: Packeteer, Inc., Cupertino, CA (US)

(*) Notice: Subject to any disclaimer, the term of this patent is extended or adjusted under 35 U.S.C. 154(b) by 779 days.

(21) Appl. No.: 09/896,887

(22) Filed: Jun. 28, 2001

(65) Prior Publication Data

US 2003/0005112 A1 Jan. 2, 2003

(51) Int. Cl.[7] .................................. G06F 15/173
(52) U.S. Cl. .................... 709/223; 709/225; 370/235
(58) Field of Search ................. 709/223–226; 370/235

(56) References Cited

U.S. PATENT DOCUMENTS

| | | | |
|---|---|---|---|
| 6,459,682 B1 * | 10/2002 | Ellesson et al. | 370/235 |
| 6,502,131 B1 * | 12/2002 | Vaid et al. | 709/224 |
| 6,681,232 B1 * | 1/2004 | Sistanizadeh et al. | 707/104.1 |
| 6,847,609 B1 * | 1/2005 | Sarnikowski et al. | 370/229 |
| 2002/0049841 A1 * | 4/2002 | Johnson et al. | 709/225 |
| 2002/0194324 A1 * | 12/2002 | Guha | 709/223 |
| 2003/0046396 A1 * | 3/2003 | Richter et al. | 709/226 |

OTHER PUBLICATIONS

Yaffe et al., "If We Just Throw Bandwidth at the Problem, Maybe It Will Go Away" and Other Delusions in Employee Internet/Intranet Access, Giga Information Group, Dec. 27, 2000.

Frame Relay Service in Today's Enterprise Network Environment, Applied Technologies Group (2000).

ATM Service, Applied Technologies Group (1997).

* cited by examiner

Primary Examiner—Wen-Tai Lin
(74) Attorney, Agent, or Firm—Mark J. Spolyar

(57) ABSTRACT

Methods, apparatuses and systems enabling a network services provider to deliver application performance management services to its enterprise customers. The invention allows network service providers to extend their service model beyond connectivity-oriented MNS services to more productivity-oriented, managed application services. The present invention, in one embodiment, allows network service providers to offer an application-aware service that provides real-time monitoring, measurement and control of application performance over MNS and other wide-area network services.

28 Claims, 4 Drawing Sheets

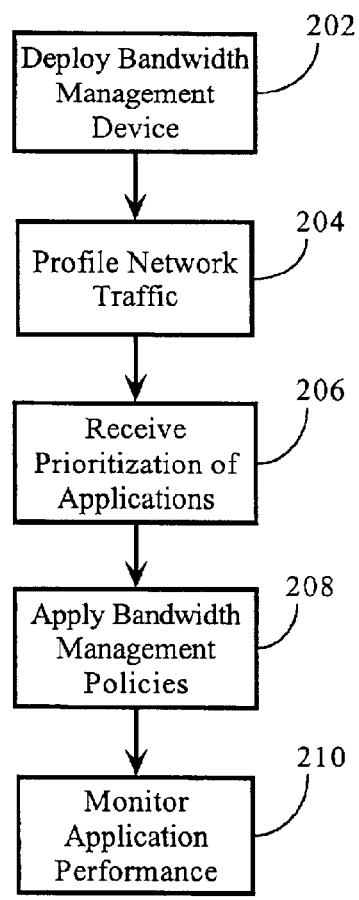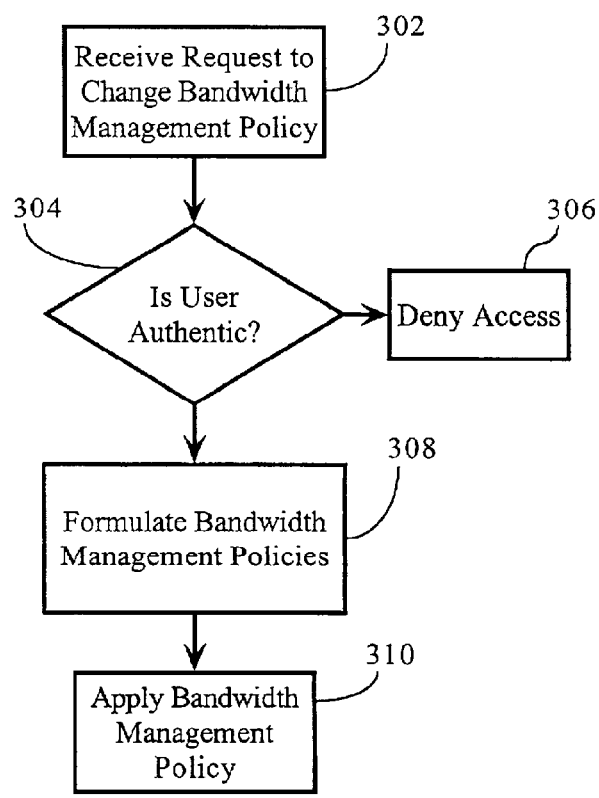
Fig._2
Fig._3

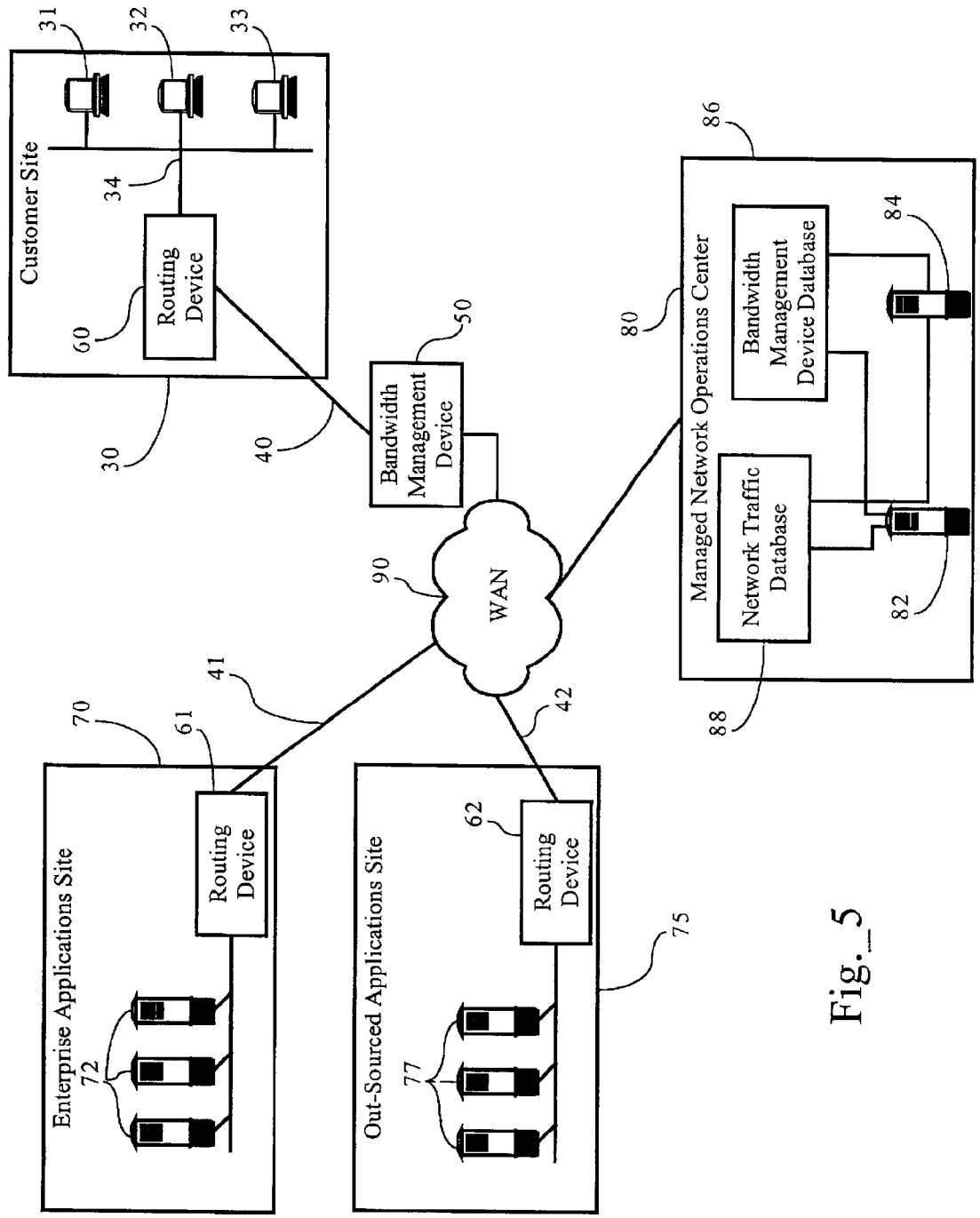
Fig._5

METHODS, APPARATUSES AND SYSTEMS ENABLING A NETWORK SERVICES PROVIDER TO DELIVER APPLICATION PERFORMANCE MANAGEMENT SERVICES

FIELD OF THE INVENTION

The present invention relates to packet-switched computer network environments and, more particularly, to methods, apparatuses and systems allowing a network service provider to deliver application performance management services to its customers.

BACKGROUND OF THE INVENTION

Businesses are growing increasingly dependent on networked applications. These applications are deployed across intranet, extranet and Internet connections to effect essential communications with workers, business partners and customers. As the number of users, applications and external traffic increases, however, network congestion forms and impairs business application performance. Moreover, as business enterprises become more dependent on the Internet and more sensitive to network congestion, the amount of network traffic from unsanctioned activities, like casual web browsing and on-line shopping, is growing dramatically, exacerbating network congestion problems. Enterprise network managers, therefore, are challenged with determining the volume, origin and nature of network traffic to align network resources with business priorities and applications.

Today, providers of network services have recognized that many business customers have limited capital and human resources to respond to changing business network requirements. In response, they have developed a portfolio of value-added managed network services (MNS) that allow their customers to out-source key design, deployment and management functions of intranet, extranet and Internet connectivity. Although these services provide managed connectivity for businesses, they are abstracted from and ignorant of the network traffic that flows across the service. When a customer experiences an application performance problem, it is difficult to determine whether the problem is induced by the MNS service or the customer's own computing and network infrastructure.

This lack of visibility and control of application performance over the MNS causes the service provider to spend resources to engage and pinpoint the problem. This often requires the service provider to send skilled personnel with diagnostic equipment to the customer's site to determine if the problem emanates from the provider's or the customer's network environment.

Currently, business customers suffering from network congestion and poor business application performance respond with several alternative solutions. The primary method of responding to poor business application performance is to increase network bandwidth. To many business, however, this approach is cost prohibitive due to the high recurring costs of bandwidth. Moreover, adding incremental bandwidth often fails because of certain forms of network traffic-usually bursty, less critical or non-sanctioned traffic-that aggressively consume the added bandwidth and leave more well-behaved business applications with little to no performance improvement.

A second approach is to manage network traffic and application performance by employing bandwidth management functionality using existing network infrastructure equipment (e.g., routers), if possible, or by deploying new bandwidth management-specific equipment. This requires the business to make substantial capital and operational investment in order to implement, manage and maintain bandwidth management technology internally. For example, to ensure the performance of their critical business applications and to control bandwidth resources, some businesses deploy bandwidth management platforms at the edge of their intranet, extranet and Internet connections. This involves installation of bandwidth management hardware followed by a process of discovering what traffic is on the network; analyzing the traffic to determine utilization and relative impact on business application performance; implementing control policies to effect the desired performance outcome; and, then setting thresholds to alert network managers to any performance degradations. For many business, however, the capital and human resource cost of deploying and managing a bandwidth management solution internally is too great.

In light of the foregoing, a need exists for methods, apparatuses and systems that allow a network service provider to offer application performance management services as an out-sourced service. At present, however, the two closest alternatives available to network service providers fall short of the capabilities necessary to support an application performance management service.

WAN Service-Level Management Services: Service providers offering wide-area network service-level management solutions do have the ability to monitor traffic flowing across its customers intranet, extranet and Internet connections. However, their monitoring abilities are limited to the different types of network protocols and do not provide adequate visibility into the type, nature, and origin of business applications and traffic from sanctioned and non-sanctioned activities. Moreover, WAN Service-Level Management solutions are completely passive and offer no means of network traffic control rendering the service incapable of resolving traffic congestion and application performance problems.

Managed Network Services (MNS): Business customers who choose to out-source their entire WAN infrastructure often deploy MNS offerings. MNS provides all of the necessary network connectivity and management infrastructure needed to connect remote business offices together, including WAN circuits, routers and on-going management services. These services, however, are connectivity-driven and are not intended to align directly with application productivity needs. Therefore, they lack the necessary bandwidth management technology for peering deep into network traffic to isolate and control the stream of application traffic with differing business priorities. MNS services also lack the policy-based management and accompanying infrastructure to mass provision and manage business customer applications as an out-sourced function.

SUMMARY OF THE INVENTION

The present invention provides methods, apparatuses and systems enabling a network services provider to deliver application performance management services to enterprise customers. The present invention allows network service providers to extend their service model beyond connectivity-oriented MNS services to more productivity-oriented, managed application services. The present invention, in one embodiment, allows network service providers to offer an application-aware service that provides real-time monitoring, measurement and control of application performance over MNS and other wide-area network services. One embodiment of the present invention allows network service providers to configure and maintain, at a central location, application performance management services to a plurality of enterprise customers Network services providers can quickly determine the source of application performance problems and, if appropriate, adjust traffic control policies within the service platform or take other corrective actions to address the problem. Embodiments of the present invention eliminate the significant time and expense associated with sending skilled personnel to customer sites for troubleshooting and problem resolution.

DESCRIPTION OF THE DRAWINGS

FIG. 2 is a flow chart illustrating a method according to an embodiment of the present invention.

FIG. 3 is a flow chart illustrating a method according to an embodiment of the present invention.

FIG. 5 is a functional block diagram showing another alternate deployment location for a bandwidth management device.

DESCRIPTION OF PREFERRED EMBODIMENT (S)

I. Operating Environment

Figure 1:
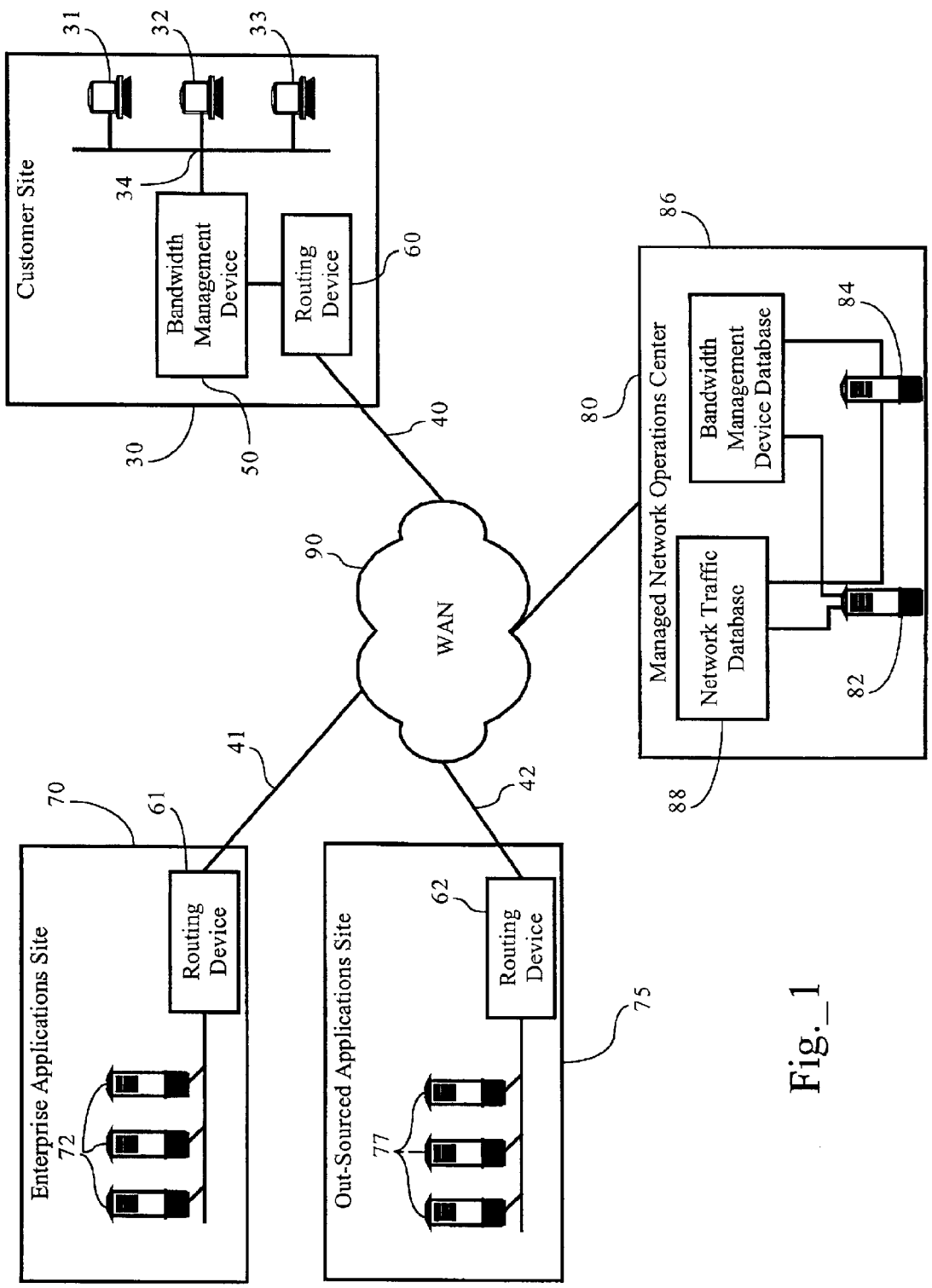
FIG. 1 is a functional block diagram illustrating an embodiment of the present invention.

FIG. 1 illustrates an inter-network of a plurality of clients and a plurality of servers that process data flows through a packet-switched, wide area network (WAN). As shown in FIG. 1, one embodiment of the present invention operates across a wide area network 90 in connection with at least one customer site 30 associated with an enterprise customer, remote enterprise application site 70, out-sourced applications site 75, and managed network operations center 80. Wide area network 90 is maintained by a Network Services Provider (NSP), such as an interexchange carrier or a local exchange carrier. The NSP routes all traffic and provides the infrastructure needed for Internet and other WAN connectivity. The NSP operates one to a plurality of network operations centers. A network operations center (NOC) supervises, monitors and maintains the NSP's network. In one embodiment, the NOC includes functionality allowing for visualizations of the network or networks that are being monitored, workstations at which the detailed status of the network can be seen, and the necessary software to manage the networks. The network operations center is the focal point for network troubleshooting, software distribution and updating, router and domain name management, performance monitoring, and coordination with affiliated networks.

Figure 4:
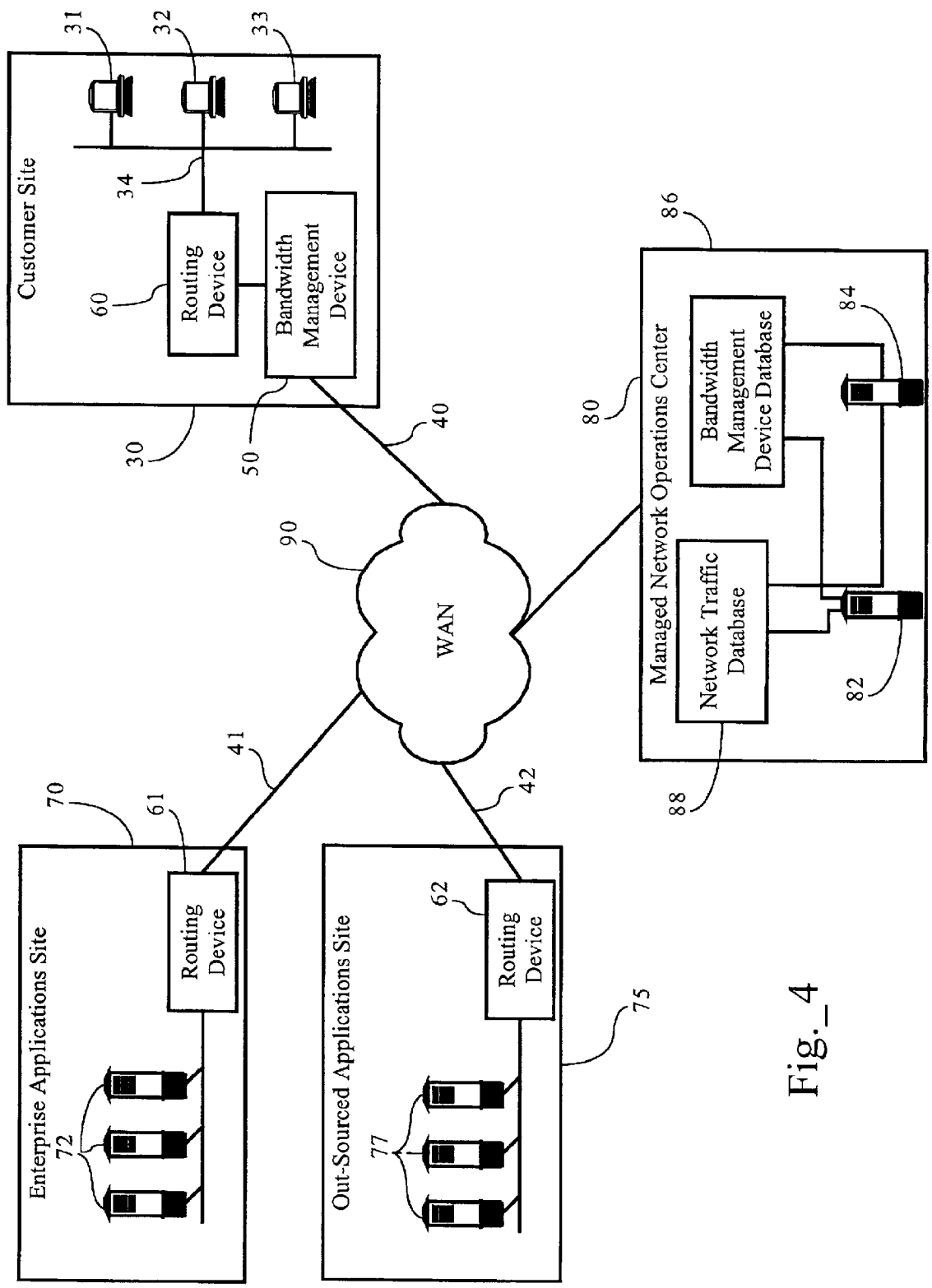
FIG. 4 is a functional block diagram illustrating an alternate deployment location for a bandwidth management device.

According to one embodiment, the present invention is implemented by a provider of Managed Network Services (MNS) that deploys and maintains intranet, extranet, Internet and/or other WAN connectivity on behalf of a plurality of enterprise customers. Such a MNS provider may be a Network Services Provider or an entity that leases connectivity to a wide area network from an interexchange carrier or a local exchange carrier. In one embodiment, the MNS provider operates one or more network operations centers (referred to herein as a Managed Network Operations Center) having functionality providing "application-aware" traffic monitoring and control capabilities, as more fully described below. In one embodiment, the extended functionality of the managed network operations center is integrated into the existing network operations centers operated by a Network Services Provider. In another embodiment, the functionality of the managed network operations center resides in a separate facility run by the MNS provider. FIGS. 1, 4 and 5 show only one customer site 30 for illustrative purposes only; the present invention enables an MNS provider to deploy application performance management services to a plurality of customer sites 30 each associated with different enterprise customers.

A. Bandwidth Management Device

Bandwidth management device 50 monitors and controls network traffic on access link 40. Bandwidth management device 50 provides "application aware" monitoring of network traffic enabling classification of network traffic flows on a per application basis. In one embodiment, bandwidth management device 50 includes functionality allowing for classification of network traffic based on information from layers 2 to 7 of the OSI reference model. In one embodiment, bandwidth management device 50 allocates resources, including bandwidth, according to the needs of applications and priorities specified by customer site 30. In one embodiment, bandwidth management device 50 controls network traffic across access link 40 on an application-level basis based on a set of bandwidth management policies. Bandwidth management device 50, in a TCP/IP network environment, controls network flow by pacing the flow of packets onto access link 40. Bandwidth management policies may operate to allocate bandwidth minimums and/or maximums to individual sessions or to applications as a whole, both as to inbound and outbound traffic. In one embodiment, bandwidth management device 50 includes packet transmission rate control functionality that explicitly manages bandwidth and smooths out bursty network traffic. Additionally, bandwidth management device transmits data relating to network traffic across access link 40 to device manager server 82, as described below. In one embodiment, bandwidth management device 50 further includes customer portal functionality allowing, for instance, network administrators at customer site 30 to monitor operation of bandwidth management device 50, configure and/or re-configure bandwidth management policies, and view reports detailing application performance and bandwidth utilization, as described below.

In one embodiment, bandwidth management device 50 includes all or a subset of known bandwidth management functionality, such as that contained in a hardware appliance sold under the trademark PACKETSHAPER® by Packeteer, Inc. of Cupertino, Calif. For example, bandwidth management device 50 may include any or all of the functionality disclosed in the following co-owned patents, all of which are incorporated by reference herein: 1) U.S. Pat. No. 5,802,106, entitled "Method for Rapid Data Rate Detection in a Packet Communication Environment Without Data Rate Supervision"; 2) U.S. Pat. No. 6,018,516, entitled "Method for Minimizing Unneeded Retransmission of Packets in a Packet Communication Environment Supporting a Plurality of Data Link Rates"; 3) U.S. Pat. No. 6,038,216, entitled "Method for Explicit Data Rate Control in a Packet Communication Environment Without Data Rate Supervision"; 4) U.S. Pat. No. 6,046,980 entitled "System for Managing Flow Bandwidth at Network, Transport and Application Layers in Store and Forward Network"; 5) U.S. Pat. No. 6,115,357, entitled "Method for Pacing Data Flow in a Packet-Based Network"; and 6) U.S. Pat. No. 6,205,120, entitled "Method for Transparently Determining and Setting an Optimal Minimum Required TCP Window Size."

Additionally, bandwidth management device 50 may further include functionality described in co-owned and pending applications, both of which are incorporated by reference herein: 1) U.S. Ser. No. 09/198,090, filed Nov. 23, 1998, entitled "Method for Automatically Classifying Traffic in a Packet Communications Network", now U.S. Pat. No. 6,412,000; and 2) U.S. Ser. No. 09/710,442, filed Nov. 10, 2000, entitled "Application Service Level Mediation and Method of Using the Same".

FIGS. 1, 4 and 5 illustrate various deployment locations for bandwidth management device 50. Bandwidth management device 50 may be deployed as customer premise equipment, as FIG. 1 shows, between network 34 and routing device 60 or, as FIG. 4 shows, between routing device 60 and access link 40. Bandwidth management device 50 may also reside, as FIG. 5 illustrates, between access link 40 and wide area network 90. Moreover, the functionality performed by bandwidth management device 50 may reside on hosts 31, 32 and 33, in routing device 60, or at any location on access link 40 where network traffic may be monitored and controlled. In addition, bandwidth management device may also reside on the network routers associated with wide area network 90.

B. Managed Network Operations Center

Managed Network Operations Center 80, in one embodiment, provides managed network services to customer site 30, as well as other customer sites associated with the same enterprise customers or different enterprise customers. In one embodiment, managed network operations center 80 provides network connectivity and management infrastructure needed to connect remote business offices together (such as customer site 30 and enterprise application site 70), including WAN circuits, routers and on-going management services. As shown in FIG. 1, managed network operations center 80 provides Internet and other WAN connectivity to customer site 30 via access link 40 and wide area network 90. According to one embodiment of the present invention, managed network operations center 80 monitors and maintains access link 40 as part of a managed network services offering provided to customer site 30. In one embodiment, managed network operations center 80 provides frame relay service providing an inter-connection between network 34 of customer site 30 and wide area network 90. However, managed network operations center 80 may provide other types of network connectivity, such as leased line service, Asynchronous Transfer Mode (ATM) service, IP-based network service or any other suitable form of network service.

In one embodiment, managed network operations center 80 provides for remote monitoring of the physical elements of wide area network 90 and access link 40. Managed network operations center 80 also provides for remote monitoring of network performance and network traffic across access link 40, as more fully described below. Managed network operations center 80 further provides real-time access to information using either SNMP (Simple Network Management Protocol) based systems or proprietary software that provides access to information about customer site's 30 WAN connectivity.

As more fully described below, managed network operations center 80 deploys bandwidth management device 50, in one embodiment, as customer premise equipment to provide application performance management services to customer site 30. As part of a managed network services offering, managed network operations center 80 provides a central point of management, configuration, monitoring and reporting associated with a plurality of bandwidth management devices 50 across a plurality of customer sites associated with one or more enterprise customers.

As FIG. 1 illustrates, managed network operations center 80 includes device manager server 82 and data analysis server 84. Managed network operations center 80 further includes at least one database server supporting bandwidth management device database 86 and network traffic database 88. Bandwidth management device database 86 stores data relating to bandwidth management devices 50 deployed at various customer sites 30. In one embodiment, bandwidth management device database 86 includes a global customer identification for each enterprise customer. Bandwidth management device database 86 further stores at least one customer site identification in association with the global customer identification. As to each customer site identification, bandwidth management device database 86 data relating to the customer site, such as physical address, contact numbers, contact names for network administrators associated with the customer site, and passwords for authentication of users. In addition, as to each customer site identification, bandwidth management device database 86 stores a bandwidth management device table including bandwidth management device identification(s), computer network address(es) (e.g., IP address(es)) of the bandwidth management device(s), the physical location of the bandwidth management device(s) at the customer site, access link data (e.g., intranet, extranet, WAN, frame relay, ATM, etc.), and a set of bandwidth management policies for each bandwidth management device or a pointer to each policy set.

Network traffic database 88 stores application performance and bandwidth utilization data relating to the network traffic across the access links (e.g., access link 40) interconnecting wide area network 90 to a plurality of customer sites 30 associated with various enterprise customers. In one embodiment, application performance and bandwidth utilization data includes utilization of bandwidth by applications running at customer sites 30 over an analysis interval, and response time data, over the analysis interval, associated with applications, including total round trip times for network traffic (i.e., from client to server to client) and allocation of round trip time along the demarcation point between customer site 30 and the facilities of the Network Services Provider, as more fully described in co-pending application Ser. No. 09/710,442, filed Nov. 10, 2000 and entitled "Application Service Level Mediation and Method of Using the Same". However, bandwidth management device 50 can be used to collect an array of application performance and bandwidth utilization data, including but not limited to 1) response time, 2) variation in response time, 3) response time distribution, 4) service level violations (e.g., number of instances where response time exceeded a specified threshold), 5) availability of an application service traversing access link 40, 6) efficiency (e.g., number of dropped packets), 7) raw throughput as to number of bytes and/or transactions, and 8) average and peak traffic loads on access link 40.

Device manager server 82 receives application performance and bandwidth utilization data from bandwidth management device 50 and stores the data in network traffic database 88. In one embodiment, the unit of application performance and bandwidth utilization data includes a field identifying the specific bandwidth management device associated with the data. Other fields in the data unit can include transmission data and time, analysis time interval, and any other suitable information. In one embodiment, application performance and bandwidth utilization data can be raw data collected by bandwidth management device 50 and transmitted to device manager server 86 for analysis and reporting on a periodic basis. In another embodiment, bandwidth management device 50 includes functionality allowing for at least partial analysis and summarization of the data over the collection interval. In one embodiment, bandwidth management device 50 transmits the analyzed data and/or the raw data to device manager server 86, which stores the data in network traffic database 88. Application performance and bandwidth utilization data can be collected using a variety of content transport mechanisms, including but not limited to SNMP, XML, HTTP, etc.

Beyond the functionality described above, device manager server 82 provides a central point of administration and access to bandwidth management and reporting functionality across a plurality of enterprise customers and customer sites. Device manager server 82 is operable to authenticate users, such as network administrators at customer sites 30, receive data relating to application priorities and/or application bandwidth partitioning, formulate bandwidth management policies, and apply them to bandwidth management devices 50 at customer sites across enterprise customers.

Data analysis server 84 is operable to analyze network traffic data to generate statistics and other measurements characterizing the behavior of network 34 at a particular customer site 30 or at multiple customer sites associated with a particular enterprise customer. Data analysis server 84 operates on data stored in network traffic database 88 to generate reports detailing application performance and bandwidth utilization across access link 40. In one embodiment, data analysis server 84 generates reports on an on-demand basis. In another embodiment, data analysis server 84 is configured to generate reports on a periodic basis (e.g., daily, weekly, and/or monthly). In one embodiment, managed network operations center 80 transmits such reports in e-mails, attachments to e-mails, or any other suitable data push mechanism. In another embodiment, such reports are viewable as web pages or other file types accessed by a network administrator using, for example, a browser at host 31. In one embodiment, a network administrator can access network traffic database 88 to produce reports that include the traffic classes and time intervals of interest to the administrator. In one embodiment, data analysis server 84 generates graphs and charts providing a high-level view of network traffic statistics. In one embodiment, network traffic statistics are stored in a management information base (MIB) accessible to any Simple Network Management Protocol (SNMP) platform. In one embodiment, bandwidth management device 50 includes a customer portal featuring SNMP functionality that allows a network administrator at customer site 30 to generate and view reports detailing bandwidth utilization and other network traffic statistics.

The reporting functionality of data analysis server 84 allows network administrators to view reports detailing application performance and bandwidth utilization and/or compliance with service-level goals in order to determine if adjustments to bandwidth management policies should be made. Such reports can include average and peak traffic levels, top bandwidth consumers both as to users and applications, application response time (divided into time spent in transit v. time spent on server), comparisons between actual performance and service-level goals, clients and servers with worst performance statistics, per-application statistics, per-user statistics, and network efficiency. As more fully described in co-pending application Ser. No. 09/198,090, supra, network traffic can be classified according to layers 2 through 7 of the OSI networking model, for example, by application, protocol, port number, URL, host name, host lists, DiffServ setting, IP precedence bits, IP or MAC address, Oracle database, Citrix published application, and more. In one embodiment, the listing and format of network traffic classes in the report is configurable by the enterprise customer. In one embodiment, the list of traffic classes is arranged in a hierarchical display.

C. Enterprise Customer

As discussed above, a typical enterprise customer includes at least one customer site 30 running networked applications via wide area network 90 in connection with at least one enterprise applications site 70 and/or out-sourced applications site 75.

Customer site 30 can be an enterprises's headquarters or a branch office. Of course, the present invention can operate in connection with multiple customer sites associated with one or more business enterprises. As FIG. 1 shows, customer site 30 remotely accesses data and applications residing on servers 72 and 77 via wide area network 90 at remote enterprise application site 70 and/or out-sourced applications site 75. As FIG. 1 shows, customer site 30 includes a network 34 linking together hosts 31, 32, and 33. Although network 34 is shown as an Ethernet network, other types of networks can be used such as a Token Ring network. Hosts 31, 32, and 33 can be generally be any computer or computing device running any operating system. Network 34 is connected to wide area network 90 via routing device 60 and access link 40. Wide area network 90 provides a logical connection to remote enterprise applications site 70 and out-sourced applications site 75 via access links 41 and 42 and routing devices 61 and 62, respectively. The gateway system of routing devices 60, 61 and 62 may also include other functionality such as firewalls, network bridges, and virtual private networks.

Access links 40, 41, and 42 can be provided by a combination of variety of different devices. For example, access link 40 can be a leased line including CSU/DSU units as Customer Premise Equipment (CPE) and network equipment at the carrier's network. In addition, access link 40 can be provided by a carrier offering frame relay service and, therefore, can include Frame Relay Access Devices (FRADs) as customer premise equipment. In one embodiment, routing device 60 further includes functionality providing data link layer connectivity such as a frame relay, leased line or ATM connectivity. Moreover, access link 40 may involve a physical connection, a wireless connection, or a combination thereof.

II. Operation

A. Deployment of Application Performance Management Services

Before a network service provider (NSP) can provision application performance management (APM) services for an enterprise customer, it must first perform traffic profiling on all or a statistically significant sampling of the affected enterprise customer sites. Traffic profiling follows the installation of bandwidth management device 50. In one embodiment, to provide application performance management services to customer site 30, managed network operations center 80 deploys bandwidth management device 50 at each managed termination point on the enterprise customer's WAN connections-here, access link 40 (see FIG. 2, step 202). Bandwidth management device 50 then profiles the network traffic across access link 40 to identify bandwidth utilization and application performance (step 204). In order to gain an accurate network traffic profile, the NSP runs bandwidth management device 50 in monitor-mode for a statistically sufficient period (e.g., 24 hours). At the end of the monitoring period, the traffic profile data is then uploaded to an application performance reporting system (e.g., device manager server 82 and/or data analysis server 84 of managed network operations center 80) where it can be stored in network traffic database 88 and analyzed.

In one embodiment, the metrics gleaned from the network traffic profiling process, and used to determine appropriate bandwidth management policies, include:

Traffic Classification: How many different classes of traffic, by type and origin, are running across access link 40. This information is used to segregate and quantify traffic that is business-critical, non-business-critical-but-sanctioned, and non-sanctioned.

Bandwidth Utilization: How much bandwidth each class of traffic consume. Measurements include average and peak utilization over a sampling interval. In one embodiment, the sampling interval is less than 1 minute.

Top Talkers/Listeners: What are the ten (10) top traffic transmitters (talkers) and receivers (listeners) from a bandwidth utilization perspective.

Bandwidth Efficiency: Measures the efficiency in which bandwidth is being consumed by measuring the ratio of successfully transmitted to unsuccessfully transmitted packets. A bandwidth efficiency ratio of less than 100% indicates the network is discarding traffic (i.e., packets).

Response-Time: What are the round-trip response-times for each traffic class and their composite response-time components of server and network latency.

Managed network operations center 80 then compiles a report detailing application bandwidth utilization and application performance, including some or all of the metrics discussed above, and transmits or otherwise delivers the report to the enterprise customer (e.g., network administrators at customer site 30) for review. For example, the report could reveal to customer site 30 that a large amount of available bandwidth is consumed by nonsanctioned traffic, such as web browsing or on-line shopping, while critical business applications running between customer site 30 and remote enterprise applications site 70 are struggling for bandwidth. Managed network operations center 80 then receives from the enterprise customer a prioritization of applications based on the profiled network traffic (step 206). The enterprise customer can assign applications to a variety of pre-determined priority categories such as "mission critical," "average," "low," and "prohibited." In another embodiment, the enterprise customer can rate applications according to a numerical hierarchy, such as 0 to 7. The enterprise customer may also specify desired performance levels for one or more applications. The enterprise customer can also choose to block certain types of network traffic altogether. In another embodiment, a service level agreement between the MNS provider and the enterprise customer defines the application priorities.

Managed network operations center 80 then formulates a set of bandwidth management policies to implement the application priorities received from customer site 30 (and/or to comply with an application-based service level agreement) and applies the set to bandwidth management device 50 (step 208). In another embodiment, customers directly configure all or a subset of available bandwidth management policies by accessing device manager server 82 via customer portal functionality on bandwidth management device 50. In one embodiment, device manager server 82 and/or the customer portal on bandwidth management device 50 provides a user interface facilitating the configuration of bandwidth management policies. In one embodiment, the user interface facilitates the selection of a class of network traffic (e.g., on an application-level basis, user-level basis, session-level basis, or other basis) and the association of application performance and/or bandwidth utilization parameters (e.g., priority levels, admissibility, minimum transmission rates, and/or a other bandwidth utilization parameters) with the selected class of network traffic. In one embodiment, bandwidth management device 50 includes an IP address which managed network operations center 80 uses to transmit the set of bandwidth management policies. Subsequently, managed network operations center 80 monitors application performance across access link 40 via bandwidth management device 50 to assess compliance with the priorities of the enterprise customer (step 210).

A core step in provisioning application performance management services is the definition of quality of service (QoS) and measurement policies that control how bandwidth management device 50 processes and quantifies traffic flowing across access link 40 to achieve a desired performance outcome. Bandwidth management policies, in effect, control the flow of traffic in terms of admissibility, relative and absolute priority, and bandwidth reservation and allocation in accordance with business importance. Certain bandwidth management policies define the measure of acceptable service-level thresholds and the desired action to be taken if thresholds are not met.

In one embodiment, bandwidth management policies can be grouped into two functional categories: service envelope and traffic flow policies. As discussed below, in one embodiment, service envelope policies are exclusively configured by personnel at managed network operations center 80, while traffic flow policies can be configured by enterprise customers and/or personnel associated with managed network operations center 80. Service envelope policies, in one embodiment, are cost-driven policies that define the allocation, mapping, billing and mediation of network sources based on price-performance. For example, service providers typically tariff packet-based managed network services on minimum committed bandwidth allocations. Service envelope policies also define how traffic will be mapped from access link 40 to backbone network service classes using traffic marking techniques. Service envelope policies are service provider defined and provisioned, and include: committed bandwidth allocation and allowable burst allocation, traffic marking (based, in one embodiment, on Diffserv packet marking standard), billing and accounting, and service-level verification and mediation—which defines specific service-level component thresholds and what actions are to be taken in the event of a violation. Service-level metrics include: service availability, throughput, efficiency and latency. Traffic flow policies define how traffic is to be controlled on an aggregate and per-flow (e.g., per-user-session or per-TCP-connection) basis. They can be defined by the service provider, customer (i.e., self-provisioned) or jointly depending on service structure. These policies include admission control (e.g., allow, deny, discard traffic), bandwidth reservation, allocation and sharing, as well as absolute (rate-based) and relative transmission priorities.

B. On-going Management of Bandwidth Utilization and Application Performance

As discussed above, managed network operations center 80 provides customers with reports detailing application performance and bandwidth utilization levels. In one embodiment, the reports detail application performance and bandwidth utilization levels in relation to the application priorities specified by the enterprise customer. In another embodiment, the reports detail application performance and bandwidth utilization levels in relation to an application-based service level agreement entered into between the enterprise customer and the network services provider. Bandwidth management device 50, in one embodiment, includes a customer portal providing a point of interaction with managed network operations center 80. In one embodiment, the customer portal includes a graphical user interface accessible to an enterprise customer network administrator using browsing software on hosts 31, 32, or 33. Using the customer portal, a network administrator can access the functionality of managed network operations center 80 to change a bandwidth management policy implemented by bandwidth management device 50. The method shown in FIG. 3 is illustrative. In one embodiment, device manager server 82 at managed network operations center 80 receives a request to change a bandwidth management policy from a customer enterprise network administrator at customer site 30 (FIG. 3, step 302). Device manager server 82 authenticates the administrator by prompting him or her for a password (see step 304). If the administrator is authenticated, device manager server 82 processes the requested change (step 308) and applies a new set of bandwidth management policies to bandwidth management device 50 (step 310). In one embodiment, device manager server 82 also stores the set of bandwidth management policies in bandwidth management device database 86.

In one embodiment, the customer portal provides a division of configurable service parameters between the network services provider and customer site 30. Since the configuration and reconfiguration of bandwidth management device 50 occurs through a centralized point of administration, managed network operations center 80 can control what parameters (bandwidth management policies) its enterprise customers may configure. For example, the present invention can be configured to allow customer site 30 to manage application performance and WAN connectivity within its existing service envelope, while allowing managed network operations center 80 exclusive control over and/or access to bandwidth allocation to customer site 30, bursting, and service-level metrics. In addition, the system allows for mapping of different applications or other classes types of network traffic to different service envelopes.

The present invention has been described with reference to specific embodiments. Other embodiments of the present invention will be apparent to one of ordinary skill in the art. It is, therefore, intended that the claims set forth below not be limited to the embodiment described above.

What is claimed is:

1. A system allowing for centralized, network application performance management services, comprising:

a wide area network maintained by a network service provider, a customer site comprising a first network, an access link between the wide area network and the first network of the customer site, a managed network operations center operably connected to the wide area network, the managed network operations center operative to monitor the wide area network, and, a bandwidth management device, residing at the customer site, and operably connected to the access link;

wherein the bandwidth management device is operable to monitor network traffic traversing the access link in relation to bandwidth utilization and application performance and transmit data related to the network traffic to the managed network operations center;

wherein the bandwidth management device is operable to control the outbound and inbound flow of network traffic across the access link based on a set of bandwidth management policies; and, wherein the managed network operations center is operable to apply to the bandwidth management device a set of bandwidth management policies based on application performance priorities received from the customer site;

wherein the bandwidth management device comprises a customer portal facilitating configuration of the set of bandwidth management policies, and wherein the managed network operations center comprises a device manager server operative to receive configuration requests from the customer site and configure the set of bandwidth management policies on the bandwidth management device via the customer portal;

and wherein the managed network operations center is operative to maintain a division between the bandwidth management policies configurable by the customer site and the bandwidth management policies configurable by the network service provider.

2. The system of claim 1 wherein the managed network operations center is operable to manage a plurality of bandwidth management devices across a plurality of enterprise customers, wherein each enterprise customer has associated therewith at least one of the plurality of bandwidth management devices.

3. The system of claim 1 wherein the managed network operations center comprises a device manager server operably connected to the wide area network to receive data from the bandwidth management device; and a network traffic database storing network traffic data corresponding to a plurality of bandwidth management devices across a plurality of business enterprises;

wherein the device manager server is operable to store the data received from the bandwidth management device in the network traffic database.

4. The system of claim 1 wherein the managed network operations center further comprises a data analysis server operable to analyze the network traffic stored in the network traffic database.

5. The system of claim 1 wherein the managed network operations center includes functionality allowing for the generation of reports related to application performance and network traffic across the access link.

6. The system of claim 5 wherein the data analysis server is operable to generate the reports related to the application performance and network traffic across the access link.

7. The system of claim 1 further comprising a routing device at the customer site between the first network and the access link, the routing device operable to route data between the wide area network and the first network.

8. The system of claim 7 wherein the bandwidth management device is located between the routing device and the access link.

9. The system of claim 7 wherein the bandwidth management device is located within the routing device.

10. The system of claim 1 wherein the bandwidth management device is located between the access link and the wide area network.

11. The system of claim 7 wherein the bandwidth management device is located between the access link and the service provider network.

12. The system of claim 1 wherein the managed network operations center is operable to alter the set of bandwidth management policies implemented by the bandwidth management device.

13. The system of claim 1 wherein the first network comprises a local area network.

14. A system allowing for centralized, network application performance management services deployed over a service provider network to a customer site, comprising:
   an access link between the service provider network and the customer site,
   a managed network operations center operably connected to and monitoring the service provider network, and
   a bandwidth management device, residing at the customer site, and operably connected to the access link;
      wherein the bandwidth management device is operable to monitor network traffic traversing the access link in relation to bandwidth utilization and application performance and transmit data related to the network traffic to the managed network operations center;
      wherein the managed network operations center is operable to receive application performance priorities from the customer site and apply a set of bandwidth management policies based on the priorities to the bandwidth management device; and
      wherein the bandwidth management device is operable to control the outbound and inbound flow of network traffic across the access link based on the set of bandwidth management policies;
      wherein the bandwidth management device comprises a customer portal facilitating configuration of the set of bandwidth management policies, and wherein the managed network operations center comprises a device manager server operative to receive configuration requests from the customer site and configure the set of bandwidth management policies on the bandwidth management device via the customer portal;
      and wherein the managed network operations center is operative to maintain a division between the bandwidth management policies configurable by the customer site and the bandwidth management policies configurable by the network service provider.

15. A method allowing for centralized application performance management services at a managed network operations center to a customer site, wherein the customer site is operably connected to a service provider network via an access link, the method comprising the steps of:
   deploying a bandwidth management device at the customer site on the access link, wherein the bandwidth management device is operable to transmit data to and receive data from the managed network operations center, and wherein the bandwidth management device is operable to control the inbound and outbound flow of network traffic across the access link based on a set of bandwidth management policies; wherein the bandwidth management device further comprises a configuration portal facilitating configuration of the set of bandwidth management policies;
   profiling with the bandwidth management device(s) the network traffic across the access link to identify bandwidth consumption of network applications;
   receiving from the customer site a prioritization of applications based on the profiled network traffic;
   applying, to the bandwidth management device via the configuration portal, a set of bandwidth management policies for controlling network traffic traversing the access link based on the prioritization received from the customer site;
   monitoring, at a managed network operations center, application performance to assess compliance with the prioritization received from the customer site; and
   maintaining a division between the bandwidth management policies configurable by the customer site and the bandwidth management policies configurable by the network service provider.

16. The method of claim 15 further comprising the step of providing a report detailing application performance and bandwidth utilization levels across the access link.

17. The method of claim 16 wherein the providing step comprises providing on-line access to the report.

18. The method of claim 15 wherein the bandwidth management device transmits data relating to the profiled network traffic to the managed network operations center.

19. The method of claim 15 wherein the monitoring step comprises the steps of
   profiling, with the bandwidth management device, the network traffic across the access link to identify bandwidth consumption of business applications and other applications; and
   receiving from the bandwidth management device data relating to the profiled network traffic.

20. The method of claim 15 wherein step of applying comprises transmitting the set of bandwidth management policies to the bandwidth management device on the access link.

21. A method enabling centralized application performance management services, wherein the services are provided by a managed network operations center operably connected to a service provider network, and wherein the services are provided to at least one enterprise site connected to the service provider network via a transmission link, the transmission link including a bandwidth management device residing at the enterprise site, and operable to monitor network traffic in relation to bandwidth utilization and application performance and transmit data related to the network traffic to the managed network operations center; wherein the bandwidth management device is operable to control outbound and inbound network traffic across the transmission link based on a set of bandwidth management policies, and wherein the bandwidth management device comprises a configuration portal facilitating configuration of the set of bandwidth management policies, and wherein the managed network operations center comprises a device manager server operative to receive configuration requests from the enterprise site and configure the set of bandwidth management policies on the bandwidth management device via the configuration portal, the method comprising the steps of:
   receiving, at the managed network operations center, a request to change a bandwidth management policy from the enterprise site;
   applying a new set of bandwidth management policies to the bandwidth management device based on the requested change; and
   maintaining a division between the bandwidth management policies configurable by the enterprise site and the bandwidth management policies configurable by the network service provider.

22. The method of claim 21 further comprising the step of authenticating a user associated with the enterprise site, before applying the new set of bandwidth management policies.

23. The method of claim 21 wherein the applying step comprises the steps of
formulating a new set of bandwidth management policies based on the desired change received from a user associated with the enterprise site; and,
transmitting the new set of bandwidth management policies to the bandwidth management device.

24. An apparatus enabling the provision of centralized application performance management services to a plurality of enterprise sites, comprising
a plurality of bandwidth management devices each corresponding to a respective enterprise site;
a device manager server operably connected to the bandwidth management devices;
wherein the bandwidth management devices are each deployed at respective ones of the enterprise sites, and are operable to monitor network traffic on respective access links between the enterprise sites and a service provider network in relation to bandwidth utilization and application performance and transmit data related to the network traffic to the device manager server;
wherein the bandwidth management devices are further operable to control outbound and inbound network traffic across the access links based on bandwidth management policies; wherein the bandwidth management devices each comorise a configuration portal facilitating configuration of the set of bandwidth management policies; and,
wherein the device manager server is operable to receive application performance priorities for access links corresponding to enterprise sites and apply via the configuration portals, a set of bandwidth management policies implementing the priorities to corresponding bandwidth management devices; and wherein the device manager server is operative to maintain a division between the bandwidth management policies configurable by the enterprise site and the bandwidth management policies configurable by the network service provider.

25. The apparatus of claim 24 further comprising a network traffic database storing network traffic data corresponding to a plurality of bandwidth management devices; and
wherein the device manager server is operable to store in the network traffic database network traffic data received from the bandwidth management devices in association with the corresponding enterprise sites.

26. The apparatus of claim 25 further comprising a data analysis server operably connected to the network traffic database;
wherein the data analysis server is operable to analyze the network traffic data corresponding to a particular access link and to generate a report characterizing application performance and bandwidth utilization across the access link.

27. The apparatus of claim 24 wherein the device manager server further comprises an interface allowing users associated with the customer sites to configure their corresponding bandwidth management devices.

28. A system allowing for centralized, network application performance management services, comprising:
a service provider network,
a customer site associated with an enterprise customer, the customer site comprising a second network and a routing device,
an access link between the service provider network and the routing device of the customer site,
wherein the routing device is operably connected to the second computer network to route data between the service provider network and the second network,
a managed network operations center operably connected to the service provider network, the managed network operations center monitoring the access link between the service provider network and the second network of the customer site,
and, a bandwidth management device, residing at the customer site between the second network and the routing device, and operably connected to the access link;
wherein the bandwidth management device is operable to monitor network traffic on the access link in relation to bandwidth utilization and application performance and transmit data related to the network traffic to the managed network operations center;
wherein the bandwidth management device is operable to control outbound and inbound network traffic traversing the access link based on a set of bandwidth management policies; and,
wherein the managed network operations center is operable to apply to the bandwidth management device a set of bandwidth management policies based on application performance priorities received from the customer site; and
wherein the managed network operations center is operable to manage a plurality of bandwidth management devices across a plurality of enterprise customers, wherein each enterprise customer has associated therewith at least one of the plurality of bandwidth management devices;
wherein the bandwidth management device comprises a customer portal facilitating configuration of the set of bandwidth management policies, and wherein the managed network operations center comprises a device manager server operative to receive configuration requests from the customer site and configure the set of bandwidth management policies on the bandwidth management device via the customer portal; and wherein the managed network operations center is operative to maintain a division between the bandwidth management policies configurable by the customer site and the bandwidth management policies configurable by the network service provider.

* * * * *

UNITED STATES PATENT AND TRADEMARK OFFICE
CERTIFICATE OF CORRECTION

PATENT NO. : 6,934,745 B2
DATED : August 25, 2005
INVENTOR(S) : Krautkremer

It is certified that error appears in the above-identified patent and that said Letters Patent is hereby corrected as shown below:

Column 15,
Line 28, replace "comorise" with -- comprise --.

Signed and Sealed this

Eighteenth Day of October, 2005

JON W. DUDAS
*Director of the United States Patent and Trademark Office*